US009573312B2

(12) United States Patent
Cruz (10) Patent No.: US 9,573,312 B2
(45) Date of Patent: Feb. 21, 2017

(54) EXFOLIATION OF GRAPHENE BY MULTILAYER COEXTRUSION (71) Applicant: Empire Technology Development LLC, Wilmington, DE (US)

(72) Inventor: Carlos A. Cruz, Holland, PA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 122 days.

(21) Appl. No.: 14/176,362

(22) Filed: Feb. 10, 2014

(65) Prior Publication Data
US 2014/0154166 A1  Jun. 5, 2014

Related U.S. Application Data (62) Division of application No. 13/002,080, filed as application No. PCT/US2010/054443 on Oct. 28, 2010, now Pat. No. 8,679,290.

(51) Int. Cl.
*B29C 47/06* (2006.01)
*B29C 47/56* (2006.01)
(Continued)

(52) U.S. Cl.
CPC .......... *B29C 47/068* (2013.01); *B29C 47/065* (2013.01); *B29C 47/56* (2013.01); *B29C 47/707* (2013.01);
(Continued)

(58) Field of Classification Search
CPC .. B32B 9/007; B32B 17/10935; B32B 37/153; B32B 2264/108; B32B 2313/04; B29C 47/06; B29C 47/065
(Continued)

(56) References Cited

U.S. PATENT DOCUMENTS 3,764,456 A  10/1973  Woodhams
3,801,429 A  4/1974  Schrenk et al.
(Continued)

FOREIGN PATENT DOCUMENTS

CN    201317092 Y     9/2009
DE    102004016308 A1  10/2005
(Continued)

OTHER PUBLICATIONS

Alfrey, et al, Physical Optics of Iridescent Multilayered Plastic Films, Polymer Engineering and Science, Nov. 1969, pp. 400-404, vol. 9, No. 6, USA.
(Continued)

*Primary Examiner* — Mark A Osele
*Assistant Examiner* — Nickolas Harm
(74) *Attorney, Agent, or Firm* — Dorsey & Whitney LLP (57) ABSTRACT Exfoliation of graphene from graphite using multilayer coextrusion is generally disclosed. In some example embodiments, graphite may be dispersed within a first processing material, and the first processing material and a second processing material may be co-extruded through a plurality of series coupled layer multiplication dies to exfoliate graphene from the graphite. The graphene may be separated from the resulting multi-layered material. In some example embodiments, graphite flake and/or expanded graphite may be dispersed within the first processing material.

19 Claims, 4 Drawing Sheets (51) Int. Cl.

| | |
|---|---|
| *B29C 47/70* | (2006.01) |
| *C01B 31/04* | (2006.01) |
| *B82Y 30/00* | (2011.01) |
| *B82Y 40/00* | (2011.01) |
| B32B 9/00 | (2006.01) |
| B32B 37/15 | (2006.01) |
| B32B 17/10 | (2006.01) |
| B29K 23/00 | (2006.01) |
| B29K 25/00 | (2006.01) |
| B29K 31/00 | (2006.01) |
| B29K 33/00 | (2006.01) |
| B29C 47/00 | (2006.01) |

(52) U.S. Cl.
CPC .............. *B82Y 30/00* (2013.01); *B82Y 40/00* (2013.01); *C01B 31/0469* (2013.01); *C01B 31/0484* (2013.01); *B29C 47/0021* (2013.01); *B29K 2023/06* (2013.01); *B29K 2023/12* (2013.01); *B29K 2025/06* (2013.01); *B29K 2031/04* (2013.01); *B29K 2033/12* (2013.01); *B29K 2995/0093* (2013.01); *B32B 9/007* (2013.01); *B32B 17/10935* (2013.01); *B32B 37/153* (2013.01); *B32B 2264/108* (2013.01); *B32B 2313/04* (2013.01); *Y10T 156/11* (2015.01); *Y10T 156/1116* (2015.01); *Y10T 156/1189* (2015.01); *Y10T 156/1195* (2015.01); *Y10T 156/1972* (2015.01)

(58) Field of Classification Search
USPC .............. 156/244.11, 246, 307.1, 314, 500
See application file for complete search history.

(56) References Cited

U.S. PATENT DOCUMENTS

| | | | |
|---|---|---|---|
| 4,987,175 | A | 1/1991 | Bunnell, Sr. |
| 5,019,446 | A | 5/1991 | Bunnell, Sr. |
| 5,065,948 | A | 11/1991 | Bunnell, Sr. |
| 5,186,919 | A | 2/1993 | Bunnell |
| 5,269,995 | A | 12/1993 | Ramanathan et al. |
| 5,468,541 | A | 11/1995 | Hsu |
| 6,261,674 | B1 | 7/2001 | Branham et al. |
| 6,827,886 | B2 | 12/2004 | Neavin et al. |
| 7,108,816 | B2 | 9/2006 | Wimberger-Friedl et al. |
| 7,303,642 | B2 | 12/2007 | Topolkaraev |
| 2007/0092716 | A1 | 4/2007 | Guo et al. |
| 2009/0218707 | A1 | 9/2009 | Stover et al. |
| 2010/0096595 | A1 | 4/2010 | Prud'Homme et al. |
| 2010/0165660 | A1* | 7/2010 | Weber ............... G02B 5/305 362/609 |

FOREIGN PATENT DOCUMENTS

| | | |
|---|---|---|
| EP | 1582572 A1 | 10/2005 |
| JP | 2008214434 A | 9/2008 |
| WO | WO 90/05761 A2 | 5/1990 |

OTHER PUBLICATIONS

Novoselov, et al., Electric Field Effect in Atomically Thin Carbon Films, Science, Oct. 24, 2004, pp. 666-669, vol. 306, www.sciencemag.org, Internet.

Grafguard, Expandable Graphite Flake, Technical Bulletin 226, GraftTech Advanced Energy Technology Inc., www.graftech.com—Jun. 14, 2010.

Alfrey, et al., Physical Optics of Iridescent Multilayered Plastic Films, Polymer Engineering and Science, Nov. 1969, pp. 400-404, vol. 9, No. 6, , USA.

Zhao, et al., Slip at polymer-polymer interfaces: Rheological measurements on coextruded multilayers, J. Rheol., Jan./Feb. 2002, pp. 145-167, vol. 46, No. 1, The Society of Rheology, Inc., USA.

Novoselov, et al., Electric Field Effect in Atomically Thin Carbon Films, Science, Oct. 24, 2004, pp. 666-669, vol. 306, www.sciencemag,org, Internet.

Stankovich, et al., Graphene-based composite materials, Nature, Jul. 20, 2006, pp. 282-286, vol. 442, Nature Publishing Group, USA.

Fowler, et al., Practical Chemical Sensors from Chemically Derived Graphene, ACS Nano, 2009, pp. 301-306, vol. 3, No. 2, American Chemical Society, USA.

Allen, et al., Honeycomb Carbon: A Review of Graphene, Chem. Rev., 2010, pp. 132-145, vol. 110, American Chemical Society, USA.

Widenkvist, Erika, Fabrication and Functionalization of Graphene and Other Carbon Nanomaterials in Solution, Uppsala University Dissertation, 2010, Sweden.

Extrusion, from Wikipedia, the free encyclopedia, http://en.wikipedia.org/wiki/Extrusion, pp. 1-10, Jun. 14, 2010.

Graphene, from Wikipedia, the free encyclopedia, http://en.wikipedia.org/wiki/Graphene, pp. 1-22, Jun. 14, 2010.

Graphite, from Wikipedia, the free encyclopedia, http://en.wikipedia.org/wiki/Graphite, pp. 1-7, Jun. 14, 2010.

Grafguard, Expandable Graphite Flake, Technical Bulletin 226, GraftTech Advanced Energy Techology Inc., www.graftech.com—Jun. 14, 2010.

International Search Report with Written Opinion regarding PCT/US2010/054443 issued Dec. 21, 2010.

Tung, V.C., et al., "High-throughput solution processing of large-scale graphene," Nature Nanotechnology, Jan. 2009, pp. 25-29, vol. 4, Macmillan Publishers Limited, London, United Kingdom.

Ming, W. and Shaoyun, "Stratified functional composites with micrometer- or nanometer-scale thickness prepared by a new processing technology," Engineering Plastics Application, vol. 36, issue 11, pp. 83-87 (2008) (English Abstract).

Ramanathan, T., et al., "Functionalized graphene sheets for polymer nanocomposites," Nature Nanotechnology, vol. 3, pp. 327-331 (Jun. 2008).

* cited by examiner

EXFOLIATION OF GRAPHENE BY MULTILAYER COEXTRUSION

CROSS-REFERENCE TO RELATED APPLICATIONS

The present application is a divisional under 35 U.S.C. §121 of and claims priority under 35 U.S.C. §120 to U.S. application Ser. No. 13/002,080, filed on Dec. 30, 2010, now U.S. Pat. No. 8,679,290, which in turn is a U.S. National Stage application under 35 U.S.C. §371 of International Application No. PCT/US2010/054443, filed on Oct. 28, 2010.

BACKGROUND

The present disclosure generally pertains to production of graphene from graphite and, more particularly, to exfoliation of graphene from graphite using multilayer coextrusion.

SUMMARY

Exfoliation of graphene from graphite using multilayer coextrusion is generally disclosed. In some example embodiments, graphite may be dispersed within a first processing material, and the first processing material and a second processing material may be co-extruded through a plurality of series coupled layer multiplication dies to exfoliate graphene from the graphite. The graphene may be separated from the resulting multi-layered material. In some example embodiments, graphite flake and/or expanded graphite may be dispersed within the first processing material.

Apparatuses for producing graphene from graphite are generally described. Some example apparatuses may include multilayer co-extrusion devices comprising a plurality of series coupled layer multiplication dies. Some example multilayer co-extrusion apparatuses may be configured to exfoliate graphene by co-extrusion of a first processing material and a second processing material through the plurality of series coupled layer multiplication dies to produce a resulting material including a plurality of alternating layers of the first processing material and the second processing material, where the first processing material may comprise a first graphite material dispersed in a first substrate and the second processing material may comprise a second substrate material.

Methods of producing graphene from graphite are generally described. Some example methods may include dispersing a first graphite material in a first substrate material to form a first processing material. Some example methods may further include exfoliating graphene from the first graphite material by co-extrusion of the first processing material and a second processing material through one or more layer multiplication dies to yield a resulting material including individual layers of the first processing material interposed between individual layers of the second processing material, the second processing material comprising a second substrate material. Some example methods may also further include separating the graphene from the first substrate material and the second substrate material.

Methods of delaminating multi-sheet substances are generally disclosed. Some example methods may include mixing a multi-sheet substance comprising a plurality of stacked sheets with a first substrate material to form a first processing material. Some example methods may further include delaminating one or more sheets from the multi-sheet substance by application of shear stress to the first processing material. Some example methods may also further include separating the one or more delaminated sheets from the first substrate material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to exfoliating graphene from graphite. For example, shear stresses caused by multilayer coextrusion of two processing materials, at least one of which may contain graphite dispersed therein, may be used to exfoliate graphene from the graphite.

The present disclosure contemplates that graphite may be described as a layered structure in which an individual layer may be called graphene. Graphene may be described as a flat monolayer of carbon atoms tightly packed into a two-dimensional honeycomb lattice. Graphene may be considered to be a basic building block for other graphitic materials.

The present disclosure contemplates that a single layer of graphene was first isolated in 2004 using a so-called peeling method, which used cellophane adhesive tape to successively remove layers from a graphite flake. Although the flakes present on the tape may be much thicker than one layer, a single sheet may be delaminated when the tape is lifted away from the graphite flake. The peeling method may require a great deal of patience, and locating a single layer may be difficult.

Example methods according to the present disclosure may utilize shear forces produced by multilayer coextrusion of processing materials (e.g., one or more organic polymers such as polyethylene, polypropylene, polyethylene oxide, polystyrene, or other similar polymers and/or one or more waxes such as polyethylene wax, and/or similar substances) to exfoliate graphene from graphite. Some example methods may allow substantially continuous production of graphene by such multilayer coextrusion.

Figure 1:
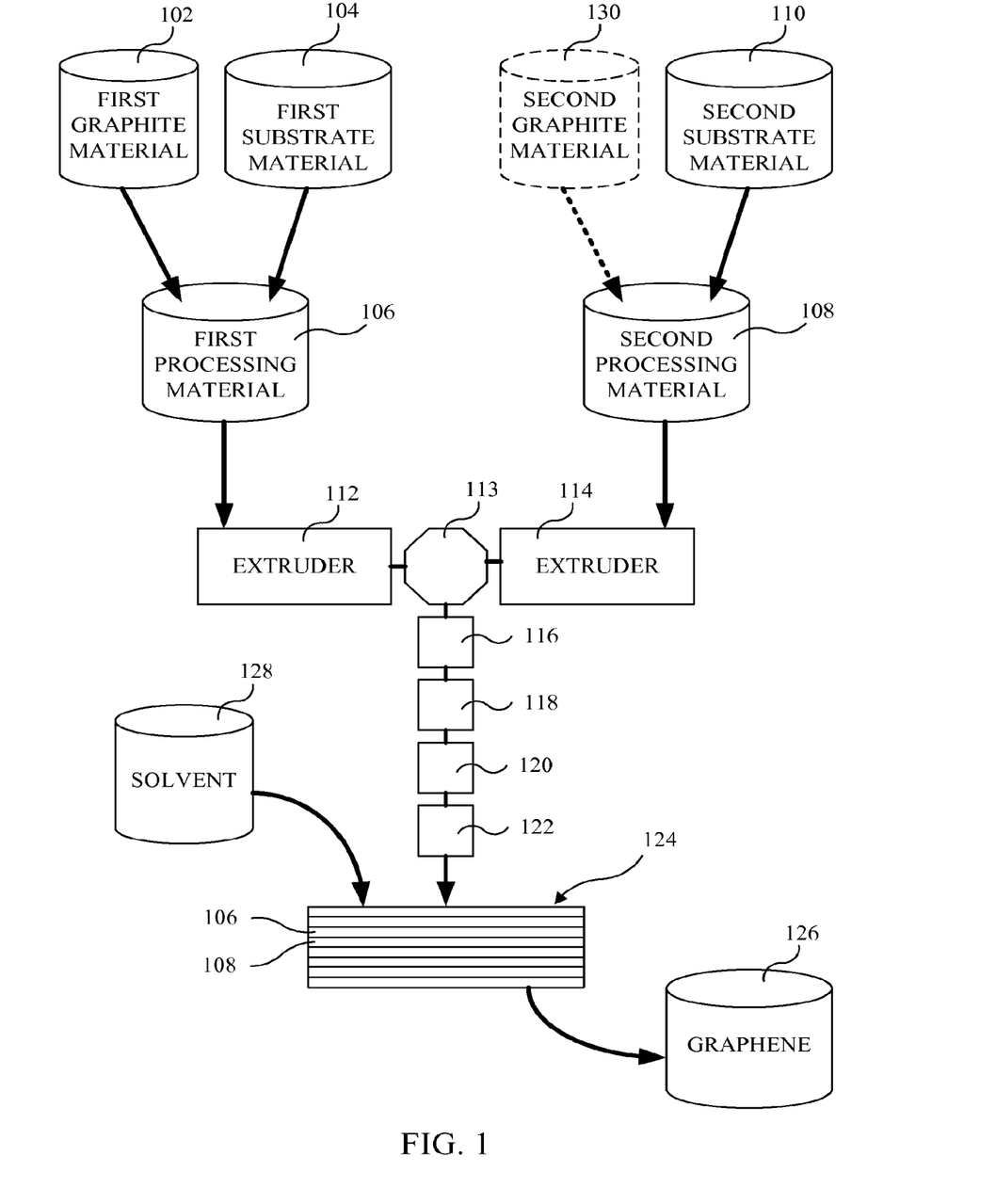
FIG. 1 is a block diagram illustrating an example device for producing graphene.

FIG. 1 is a block diagram illustrating an example device for producing graphene in accordance with at least some examples described herein. Extruders 112, 114 may be configured to supply a first processing material 106 and a second processing material 108, respectively, to a feed block 113. Feed block 113 may be configured to supply first processing material 106 and second processing material 108 to a plurality of series coupled layer multiplication dies 116, 118, 120, 122. In light of the present disclosure, it is understood that various thermal controllers, heating devices and/or even cooling devices can be readily adapted for use as a suitable means of precise temperature control.

An example method of producing graphene from graphite may comprise dispersing a first graphite material 102 in a first substrate material 104 to form first processing material 106. First processing material 106 and second processing material 108 (which may comprise a second substrate material 110) may be co-extruded, such as using extruders 112, 114 and/or feed block 113, through series coupled layer multiplication dies 116, 118, 120, 122 to produce a resulting material 124 comprising a plurality of alternating layers of first processing material 106 and second processing material 108.

Shear stresses experienced by first processing material 106 and/or second processing material 108 during coextrusion through layer multiplication dies 116, 118, 120, 122 may exfoliate at least some graphene 126 from first graphite material 102; thus, resulting material 124 may comprise graphene 126. Graphene 126 may be separated from resulting material 124, such as by at least partially dissolving first substrate material 104 and/or second substrate material 110 in a solvent 128 (e.g., water and/or an organic solvent). In some example embodiments, second processing material 108 may comprise a second graphite material 130, which may be dispersed in second substrate material 110.

The present disclosure contemplates that coextruded multilayers with numbers of layers ranging from tens of layers to thousands of layers may be made using layer multiplication dies.

Figure 2:
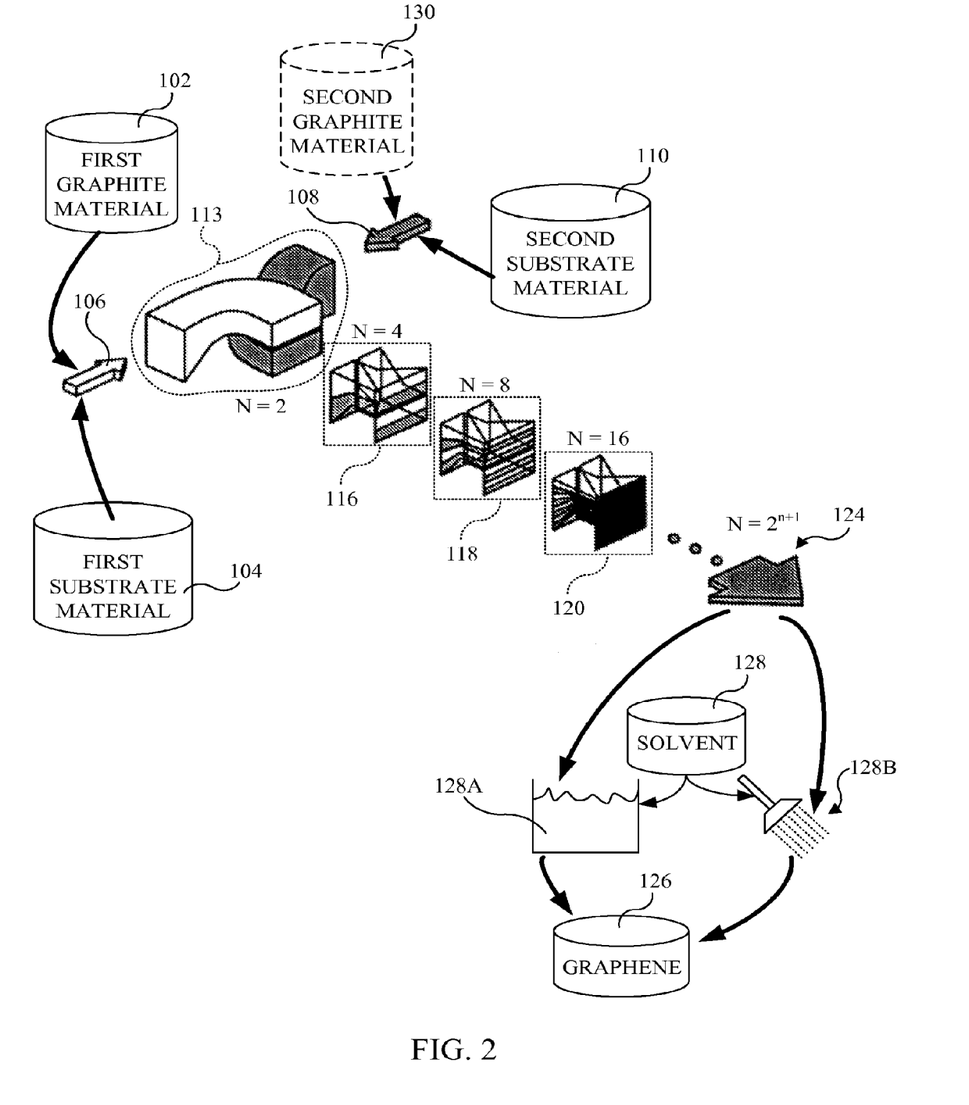
FIG. 2 is a block diagram illustrating an example device for producing graphene.

FIG. 2 is block diagram illustrating an example device for producing graphene; in accordance with at least some examples described herein. Feed block 113 may be configured to supply first processing material 106 and second processing material 108 to a plurality of series coupled layer multiplication dies 116, 118, 120 to produce resulting material 124 comprising a plurality of alternating layers of first processing material 106 and second processing material 108. In some example embodiments, resulting material 124 may be at least partially immersed in a solvent bath 128A and/or may be subjected to a solvent spray 128B to separate the graphene. In some example embodiments, resulting material 124 may be utilized for further applications without separating the graphene. For example, resulting material 124 (including the graphene) may be utilized as a concentrate that may be let down into a selected matrix.

As illustrated in FIGS. 1 and 2, first processing material 106 (which may comprise first graphite material 102 and/or first substrate material 104) and/or second processing material 108 (which may comprise second substrate material 110 and/or second graphite material 130) may be brought together in feed block 113 to form a two layer (N=2) material. The two layer material may be forced through layer multiplication die 116, which may split the two layer material into two parts (each including the two layers from material 102 and material 110), and the individual parts may be compressed, rotated, stretched, and/or stacked together with other individual parts. Layer multiplication die 116 may output a four layer (N=4) material. Layer multiplication dies 118, 120, may likewise increase the number of layers to eight (N=8) and sixteen (N=16), respectively. In some examples, a fourth layer multiplication die (e.g., layer multiplication die 122 shown in FIG. 1) may be utilized to yield a material with thirty-two (32) layers. Where individual layer multiplication dies 116, 118, 120, 122 are configured to double the number of layers, the number of layers of resulting material 124, N, may be given by $N=2^{n+1}$, where n may be the number of dies.

In some example embodiments, one or more of the layer multiplication dies 116, 118, 120, 122 may be substantially the same as one another. In some other example embodiments, one or more of the layer multiplication dies 116, 118, 120, 122 may be different than one another.

In some example embodiments, after being extruded through four layer multiplication dies 116, 118, 120, 122, the individual layers of the resulting material may be about twenty (20) μμm thick. Likewise, for eleven (11) series coupled layer multiplication dies, the resulting material may comprise about four-thousand and ninety-six (4096) layers, where each of the individual layers of the resulting material may be about one-hundred and fifty six (156) nm thick. Further increasing the number of series-coupled layer multiplication dies (e.g., about 18 series couple layer multiplication dies may produce about 524,288 layers) may yield a resulting material with individual layer thicknesses at about the Angstrom-level order of magnitude.

The present disclosure contemplates that feed block 113 may be configured to produce other numbers of layers (e.g., four layers) and/or layer multiplication dies 116, 118, 120, 122 may be configured to triple or quadruple the number of layers, for example.

In some example embodiments, first graphite material 102 and/or second graphite material 130 may comprise graphite flake and/or expanded graphite. Turning back to FIG. 1, in some example embodiments, first processing material 106 may be formed by blending first graphite material 102 (e.g., a powder) and first substrate material 104 (e.g., a powder) and/or feeding the blend into extruder 112 (which may be a single and/or a twin extruder). Second processing material 108 may be formed in a similar manner using extruder 114.

In some example embodiments, first processing material 106 may be produced by mixing first substrate material 104 and first graphite material 102 together. For example, powdered first substrate material 104 and powdered first graphite material 102 may be combined and stirred, which may disperse first graphite material 102 in first substrate material 104. In some example embodiments, first processing material 106 may be extruded and/or pelletized prior to being supplied to extruder 112. In some example embodiments, first substrate material 104 and first graphite material 102 may be heated (e.g., by heating elements and/or due to friction in an extruder) during mixing and/or during extrusion, which may at least partially melt first substrate material 104. Similarly, in some example embodiments, second processing material 108 may be produced by mixing second substrate material 110 and second graphite material 130 together. In some example embodiments, second processing material 108 may be extruded and/or pelletized prior to being supplied to extruder 114. In some example embodiments, second substrate material 110 and second graphite material 130 may be heated (e.g., by heating elements and/or due to friction in an extruder) during mixing and/or during extrusion, which may at least partially melt second substrate material 110.

In some example embodiments, first substrate material 104 and/or second substrate material 110 may have substantially the same composition and/or substantially similar properties. For example, in some example embodiments, first substrate material and/or second substrate material may both be at least partially soluble in the same solvent. In some example embodiments, first substrate material 104 and/or second substrate material 110 may comprise non-polar (hydrophobic) materials. For example, such non-polar materials may include paraffin wax materials, with or without the addition of a high molecular weight polyolefin, which may improve processing. Such materials may be useful for cold extrusion (e.g., about 25 to about 40° C.). In some example embodiments, first substrate material 104 and/or second substrate material 110 may comprise polar (hydrophilic) materials. For example, such hydrophilic materials may include polyethylene oxide (PEO), which may be useful for low temperature extrusion (e.g., about 40 to about 60° C.).

In some example embodiments, first substrate material 104 and/or second substrate material 110 may have substantially different compositions and/or properties. For example, in some example embodiments, first substrate material may comprise one or more hydrophobic polymers and/or second substrate material may comprise one or more hydrophilic polymers. For example, one of first substrate material 104 and/or second substrate material 110 may comprise a hydrophobic material (e.g., polyethylene/paraffin wax blends, polystyrene, poly (4-methyl pentene) (P4MP)). The other of first substrate material 104 and/or second substrate material 110 may comprise a hydrophilic material (e.g., polyethylene oxide, polyvinyl acetate, styrene acrylonitrile (SAN), poly (methyl methacrylate) (PMMA), polylactic acid, and/or blends of these and/or other polymers).

In some example embodiments, one or both of first processing material 106 and/or second processing material 108 (which may comprise first substrate material 104 and/or second substrate material 110, respectively) may comprise graphene. More specifically, in some example embodiments including first substrate material 104 and second substrate material 110 having substantially the same composition and/or substantially similar properties, one or both of first processing material 106 and/or second processing material 108 may include graphene. Similarly, in some example embodiments including first substrate material 104 and second substrate material 110 having substantially different compositions and/or properties, one or both of first processing material 106 and/or second processing material 108 may include graphene.

In some example embodiments, extrusion operations may be conducted at low temperatures (for example and without limitation, cold extrusion and low temperature extrusion discussed above), which may contribute to increased shear stresses within the processing material(s), which may increase the exfoliation of graphene from graphite. In some example embodiments, extrusion operations may be conducted at or near about the lowest practicable extrusion temperatures for the substrate and/or processing material(s).

The present disclosure contemplates that graphene produced as described herein may be useful in the area of polymer composites, such as where higher strength via high aspect ratio reinforcements may be advantageous. For example, graphene may be used in polyvinyl chloride (PVC) siding, which may increase the heat deflection temperature of the siding such that it may better withstand hot weather-related deformations. As another example, poly(lactic acid), a very much appreciated biopolymer, may be utilized in connection with graphene to improve its performance despite its relatively low softening temperature. As another example, graphene may be used in automotive and/or other transportation-related applications, where some under-the-hood conditions may benefit from high mechanical strength and heat resistance. As another example, when used as an additive for polystyrene-based composites, the two-dimensional geometry of graphene may provide an extremely low percolation threshold of about 0.1%, which may enhance their electrical conductivity and/or the strength of the matrix.

As another example, graphene may be used to provide electrically conductive polymers for textile applications. For example, graphene may provide long-lasting antistatic properties. As another example, graphene may be useful in some electronics-related applications.

The present disclosure contemplates that processes described herein may be used to produce substances besides graphene. For example, multilayer coextrusion processes described herein may be useful for delaminating multi-sheet substances comprising a plurality of stacked sheets. For example, the present disclosure contemplates that mica may be delaminated into its constituent sheets using multilayer coextrusion processes described herein.

Figure 3:
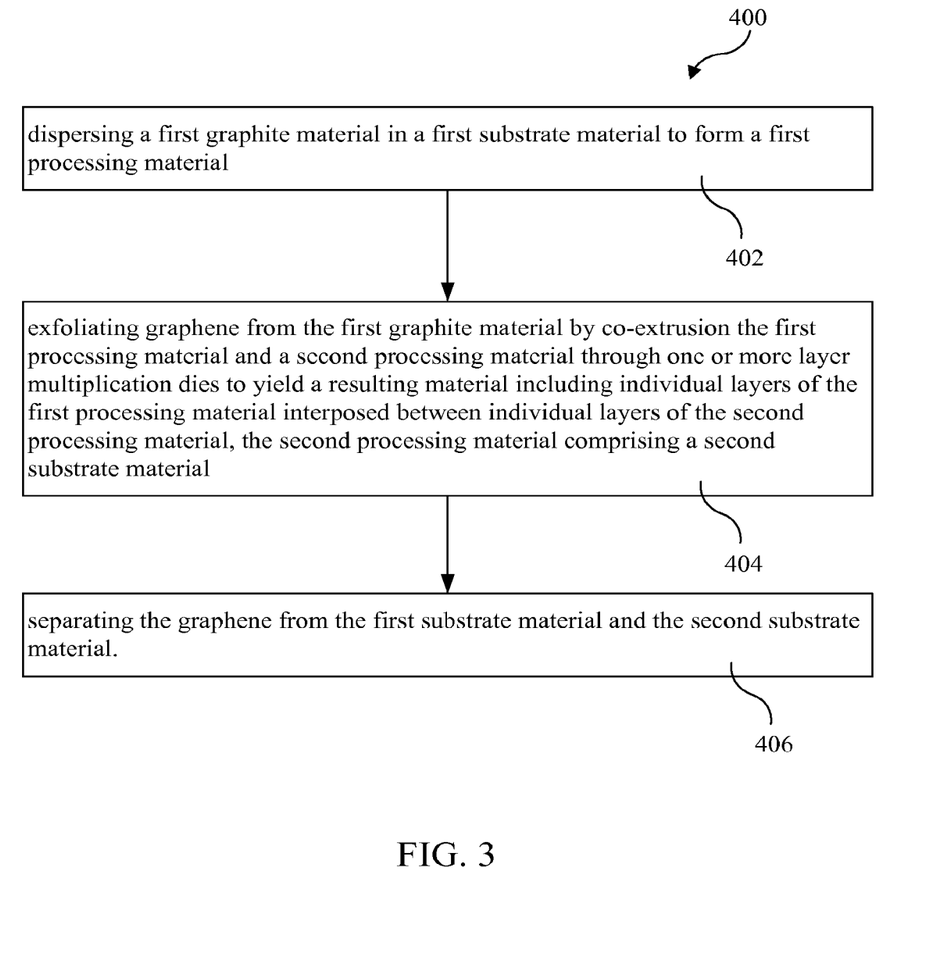
FIG. 3 is a flow chart illustrating an method of producing graphene from graphite.

FIG. 3 is a flow chart illustrating an example method 400 of producing graphene from graphite in accordance with at least some examples described herein. Method 400 may include one or more operations, functions or actions as illustrated by one or more of blocks 402, 404, and/or 406.

Processing for method 400 may begin at block 402. Block 402 may include dispersing a first graphite material in a first substrate material to form a first processing material. Block 402 may be followed by block 404. Block 404 may include exfoliating graphene from the first graphite material by co-extrusion of the first processing material and a second processing material through one or more layer multiplication dies to yield a resulting material including individual layers of the first processing material interposed between individual layers of the second processing material, the second processing material comprising a second substrate material. In some example methods, block 404 may be followed by block 406. Block 406 may include separating the graphene from the first substrate material and the second substrate material.

Figure 4:
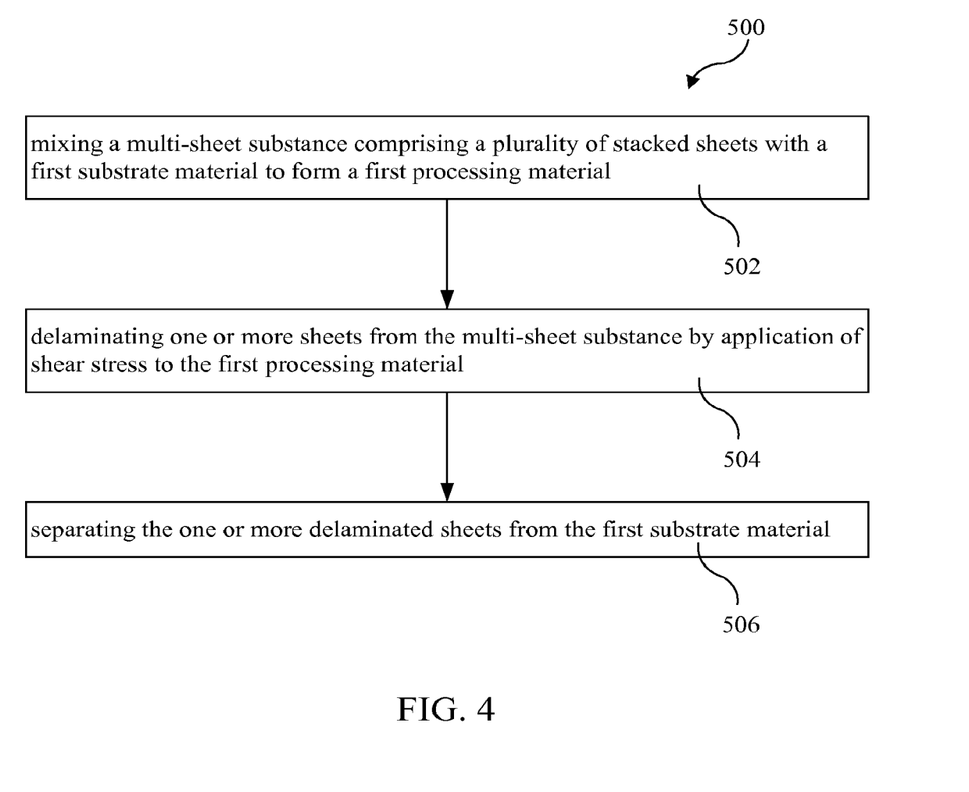
FIG. 4 is a flow chart illustrating an example method of delaminating a multi-sheet substance, all in accordance with at least some examples of the present disclosure.

FIG. 4 is a flow chart illustrating an example method 500 of delaminating a multi-sheet substance in accordance with at least some examples described herein. Method 500 may include one or more operations, functions or actions as illustrated by one or more of blocks 502, 504 and/or 506.

Processing for method 500 may begin at block 502. Block 502 may include mixing a multi-sheet substance comprising a plurality of stacked sheets with a first substrate material to form a first processing material. Block 502 may be followed by block 504. Block 504 may include delaminating one or more sheets from the multi-sheet substance by application of shear stress to the first processing material. Block 504 may be follow by block 506. Block 506 may include separating the one or more delaminated sheets from the first substrate material.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus to produce graphene from graphite, the apparatus comprising:
  a multilayer co-extrusion device comprising:
    a feed block including a first processing material and a second processing material, the first processing material including a first graphite material and the second processing material including a second graphite material;
    a plurality of series-coupled layer multiplication dies coupled to the feed block and configured to shear the first graphite material and the second graphite material, to exfoliate graphene therefrom by co-extrusion of the first processing material and the second processing material through the plurality of series-coupled layer multiplication dies, and to produce a resulting material including a plurality of alternating layers of the first processing material and the second processing material; and
    a bath including a solvent positioned to accept the resulting material.

2. The apparatus of claim 1, wherein the first processing material includes a first substrate material, and wherein the second processing material comprises a second substrate material and the second graphite material is dispersed in the second substrate material.

3. The apparatus of claim 1, wherein the multilayer co-extrusion device further comprises:
  a first extruder operably coupled to and configured to supply the first processing material to the feed block; and
  a second extruder configured to supply the second processing material to the feed block.

4. The apparatus of claim 3, wherein the multilayer co-extrusion device is configured to supply the first processing material to the feed block from the first extruder and the second processing material to the feed block from the second extruder.

5. The apparatus of claim 1, wherein the plurality of series-coupled layer multiplication dies include at least 11 series-coupled layer multiplication dies.

6. The apparatus of claim 5, wherein the plurality of series-coupled layer multiplication dies include at least 18 series-coupled layer multiplication dies.

7. The apparatus of claim 1, wherein the first processing material includes a first substrate material, and wherein the multilayer co-extrusion device is configured to disperse the second graphite material in a second substrate material.

8. The apparatus of claim 1, wherein the multilayer co-extrusion device is configured to perform one or more of cold extrusion or low temperature extrusion.

9. The apparatus of claim 1, wherein the multilayer co-extrusion device is configured to co-extrude the first processing material and the second processing material through one or more of the plurality of series-coupled layer multiplication dies at a temperature of about 25° C. to about 60° C.

10. The apparatus of claim 1, wherein the first processing material includes a first substrate material and the second processing material includes a second substrate material.

11. The apparatus of claim 10, wherein the first substrate material and the second substrate material each comprise one or more of one or more hydrophobic polymers or one or more hydrophilic polymers.

12. The apparatus of claim 10, wherein one of the first substrate material and the second substrate material comprises one or more hydrophobic polymers; and wherein the other of the first substrate material and the second substrate material comprises one or more hydrophilic polymers.

13. An apparatus to produce graphene from graphite, the apparatus comprising:
a multilayer co-extrusion device comprising:
a feed block;
a first extruder coupled to the feed block and including a first processing material that includes a first graphite material;
a second extruder coupled to the feed block and including a second processing material that includes a second graphite material; and
a plurality of series-coupled layer multiplication dies coupled to the feed block and configured to shear the first graphite material and the second graphite material, to exfoliate graphene therefrom by co-extrusion of the first processing material and the second processing material through the plurality of series-coupled layer multiplication dies, and to produce a resulting material including a plurality of alternating layers of the first processing material and the second processing material;
a source of solvent; and
a sprayer operably coupled to the source of solvent and positioned to spray the solvent onto the resulting material.

14. The apparatus of claim 13, wherein at least one of the first processing material includes a first substrate material or the second processing material includes a second substrate material.

15. The apparatus of claim 14, wherein at least one of the first graphite material is dispersed in the first substrate material or the second graphite material is dispersed in the second substrate material.

16. The apparatus of claim 14, wherein the first substrate material and the second substrate material each include one or more of one or more hydrophobic polymers or one or more hydrophilic polymers.

17. The apparatus of claim 14, wherein one of the first substrate material or the second substrate material includes one or more hydrophobic polymers; and wherein the other of the first substrate material or the second substrate material includes one or more hydrophilic polymers.

18. The apparatus of claim 13, wherein the multilayer co-extrusion device is configured to perform one or more of cold extrusion or low temperature extrusion.

19. The apparatus of claim 13, wherein the multilayer co-extrusion device is configured to co-extrude the first processing material and the second processing material through one or more of the plurality of series-coupled layer multiplication dies at a temperature of about 25° C. to about 60° C.

* * * * *

UNITED STATES PATENT AND TRADEMARK OFFICE
CERTIFICATE OF CORRECTION

PATENT NO. : 9,573,312 B2  
APPLICATION NO. : 14/176362  
DATED : February 21, 2017  
INVENTOR(S) : Cruz Page 1 of 1

It is certified that error appears in the above-identified patent and that said Letters Patent is hereby corrected as shown below:

In the Specification

Column 1, Line 8, delete "§121" and insert -- § 121 --, therefor.

Column 1, Line 8, delete "§120" and insert -- § 120 --, therefor.

Column 1, Line 11, delete "§371" and insert -- § 371 --, therefor.

Column 4, Line 31, delete "μμm" and insert -- μm --, therefor.

Signed and Sealed this  
Second Day of May, 2017

Michelle K. Lee  
*Director of the United States Patent and Trademark Office*